July 11, 1961
J. J. LA ROCCA
2,992,369
ELECTRIC SENSING DEVICE
Filed Dec. 20, 1957
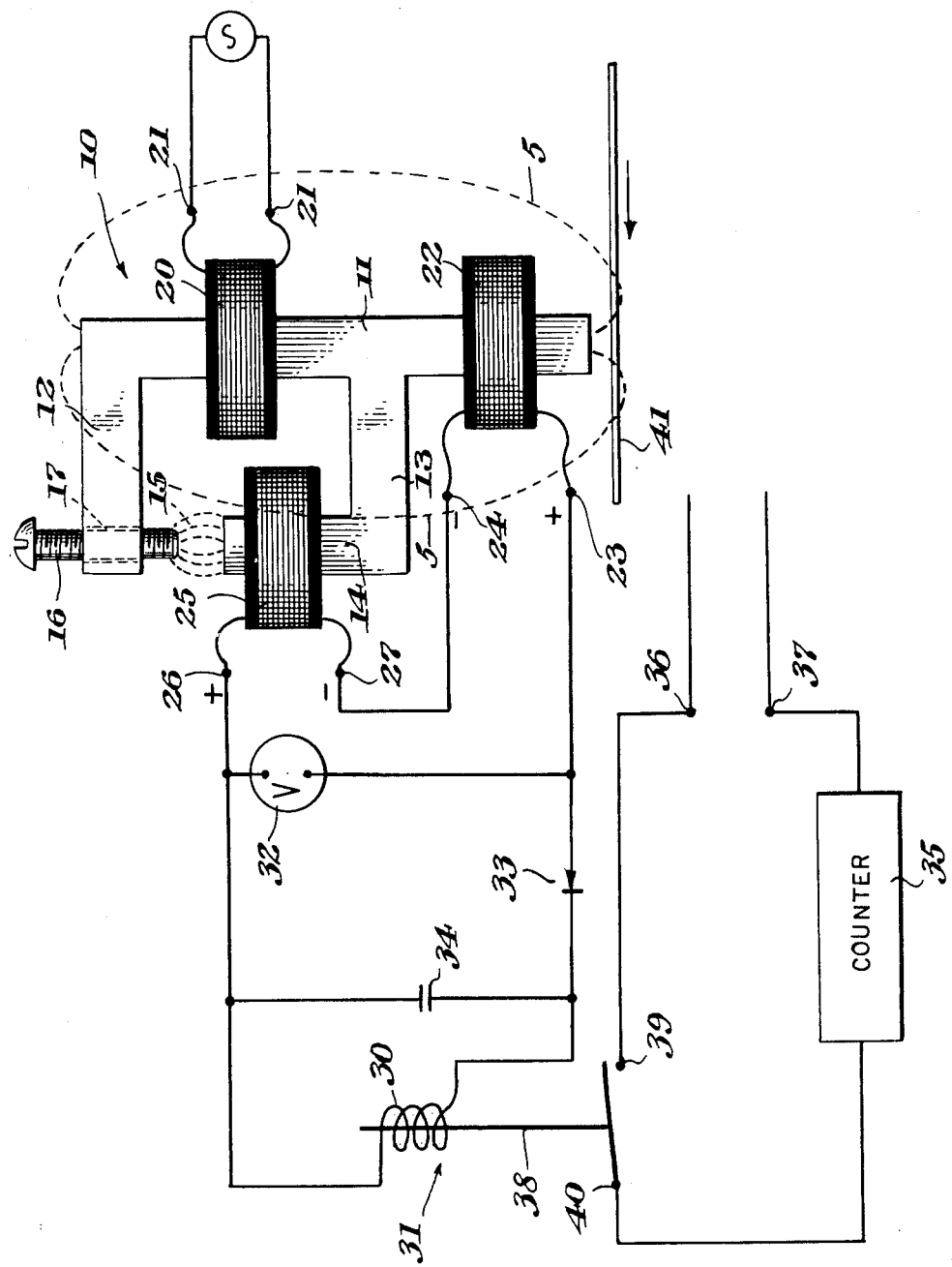
INVENTOR.
James J. LaRocca,
BY
Mason, Porter, Diller & Stewart
ATTYS.

2,992,369
ELECTRIC SENSING DEVICE
James J. La Rocca, Matteson, Ill., assignor to Continental Can Company, Inc., New York, N.Y., a corporation of New York
Filed Dec. 20, 1957, Ser. No. 704,108
4 Claims. (Cl. 317—156)

The present invention relates to a new and novel electric sensing device and more particularly to an electric sensing device wherein changes in reluctance in the magnetic circuits of the device are utilized for causing operation of a sensitive relay or the like during operation, and an adjusting means is provided for varying the sensitivity of the device.

The present invention is designed to detect and be influenced by ferrous materials, and sensing devices of this type can be employed in numerous different applications. For example, such a sensing means may be utilized when it is desired to count the number of sheets of ferrous material which pass through a magnetic field of the device, or in sorting sheets of ferrous material having different thicknesses. In such applications, a sensitive relay or the like is generally used for operating or controlling the operation of the accompanying counting or sorting equipment, and it is very desirable to provide a means whereby the change in voltage of the sensing means which is required to cause actuation of the relay may be accurately controlled, and accordingly increase the sensitivity of the device.

Adjustment means for controlling the sensitivity of such sensing devices may be incorporated in the electrical circuit of the device, thereby requiring the use of potentiometers or the like for accomplishing this purpose. Such arrangements, however, are not satisfactory because potentiometers often change their characteristics when subjected to moisture, necessitating checking of the circuit to ensure that the correct adjustment is maintained. Consequently, maintenance procedures are excessively time consuming, and furthermore, the construction of such structure is complex and expensive.

The sensing device according to the present invention avoids the difficulties encountered when potentiometers are utilized by providing a new and novel arrangement wherein an adjustment means is provided in a magnetic circuit of the device thereby eliminating the necessity of providing any adjustments in the electrical circuit by means of potentiometers or the like. As a result, the adjusting means of the present invention may be given a desired setting, and no further adjustments are required since the accuracy of the adjustment will be maintained during operation of the device. The sensing device can therefore be permanently sealed within a closed container to protect the device from foreign matter and moisture, if desired.

The present invention employs a transformer operating on 110 volts, 60 cycles, and accordingly can be employed with conventional electric power without the necessity of employing oscillator tubes for providing greater frequencies. The structure of the present invention is very compact and sturdy, and is provided with an easily operated adjusting means in the form of a simple adjusting screw which is employed to vary an air gap included in one of the magnetic circuits of the device.

An object of the present invention is to provide a new and novel electric sensing device which eliminates the necessity of providing potentiometers or the like in the electrical circuit of the device for adjusting the sensitivity thereof.

Another object is the provision of an electric sensing device which is adapted to operate on conventional electric power.

A further object of the invention is to provide an electric sensing device which is simple and inexpensive in construction, yet sturdy and reliable in operation.

Yet another object is the provision of an electric sensing device which can be placed within a sealed container.

Other objects and many of the attendant advantages of the present invention will become apparent when considered in connection with the following specification and the accompanying drawing which illustrates a schematic diagram of a preferred embodiment of the invention.

Referring now to the drawing, a ferrous core means indicated generally by reference numeral 10 includes an elongated arm 11, two arms 12 and 13 disposed normally to arm 11, and another arm 14 disposed normally to arm 13. The arms of the core may be integral with one another, or the arms may be suitably secured to one another in the position shown. The upper end of arm 14 is spaced from the lower surface of arm 12, and an adjusting means or screw 16 is mounted within a threaded opening 17 formed through arm 12, the lower end of the ferrous adjusting screw extending toward the upper end of arm 14 and defining an air gap 15 therebetween. It is apparent that the screw comprises a movable portion of the core means.

A primary coil 20 is disposed about the upper portion of arm 11, the input terminals 21 of the primary coil being connected to a suitable source of conventional electric power. A sensing coil 22 is disposed about the lower portion of arm 11 and has a positive output terminal 23 and a negative output terminal 24. The magnetic circuit magnetically connecting primary coil 20 and sensing coil 22 thereby causing energization of the sensing coil comprises the stray magnetic field set up by the primary coil as indicated by dotted lines 5—5 on the drawing and some flux linkage through the lower portion of arm 11.

A biasing coil 25 is disposed about the intermediate portion of arm 14 and has a positive output terminal 26 and a negative output terminal 27. The magnetic circuit magnetically connecting primary coil 20 and biasing coil 25 comprises the upper portion of arm 11, arms 12, 13 and 14, the lower portion of adjusting screw 16 and air gap 15.

Negative terminals 24 and 27 of coils 22 and 25 respectively, are connected to one another, and positive terminals 23 and 26 are connected across the energizing coil 30 of a sensitive relay indicated generally by reference numeral 31. In this manner, coils 22 and 25 are connected in series, but the voltages induced in the coils are substantially 180° out of phase. A voltmeter 32 is connected across output terminals 23 and 26, and a rectifier 33 is connected in series with coil 30 for changing the alternating current output from the output terminals to direct current in order to operate the relay. A filter capacitor 34 is connected in parallel with coil 30 and serves to increase the average value of the direct current produced by rectifier 33.

An electromagnetic counter of any approved form and diagrammatically indicated at 35 is connected to a suitable electrical source impressed across input terminals 36 and 37. Armature 38 of relay 31 may be biased either to a normally closed position, or a normally open position as shown on the drawing, thereby maintaining the circuit through relay contacts 39 and 40 either normally closed or normally open as the case may be. Regardless of the normal position of armature 38, counter 35 may be adjusted so as to be operated upon actuation of relay 31 by the sensing means. It is apparent that relay 31 may also be employed to operate or control the operation of any other desired mechanism such as a sorter means or the like, if desired.

In order to utilize the sensing means according to the present invention, adjusting screw 16 is initially operated to vary air gap 15 as necessary in order to obtain the desired output reference voltage as indicated by voltmeter 32. During this manipulation of the adjusting means, no ferrous material should be present in the sensing area of the device adjacent the lower end of arm 11 of the core. If, for example, the desired reference voltage is zero whereby the relay is deenergized as shown in the drawing, the adjusting screw is moved from its extreme upward position as seen in the drawing downwardly toward the upper end of arm 14 thereby decreasing the size of air gap 15 and reducing the reluctance of the magnetic circuit connecting primary coil 20 and biasing coil 25. As the reluctance is reduced, the induced voltage in coil 25 is gradually increased until it is equal to that in coil 22 whereupon the two voltages, being 180° out of phase, cancel each other out such that the resultant reference voltage as indicated on voltmeter 32 is zero.

After the initial adjustment as described above, the device is in condition for operation. Assuming that the device is to be used in the counting of metal sheets, as indicated in the example disclosure, the sheets of ferrous metal to be counted as indicated by reference numeral 41 are caused to move through the sensing area below the lower end of arm 11 of the coil by a suitable means such as a conveyor belt or the like (not shown). As the ferrous material passes through the sensing area adjacent coil 22, the reluctance of the stray magnetic field linking coil 22 to primary coil 20 is reduced and the inductance of coil 22 is increased, thereby increasing the voltage induced in coil 22. The output voltage at terminals 23, 26 is correspondingly increased causing energization of relay 31.

When the device is adjusted so as to have an initial or reference voltage of zero across the output terminals of coils 22 and 25, the presence of ferrous material in the sensing area will cause the output voltage to increase. However, it requires a finite voltage in coil 30 of the sensitive relay to cause the relay to operate. If sufficient sensitivity of the invention device is not obtained with a zero reference voltage, adjusting screw 16 may be initially adjusted such that the voltage induced in coil 25 is greater than that induced in coil 22 thereby producing a reference voltage which maintains the relay in energized position. The reference voltage may be set slightly above the voltage which will cause the relay to be deenergized. Upon entry of a sheet of ferrous material into the sensing area, the voltage in coil 22 increases, and since it is 180° out of phase with the voltage induced in coil 25, the output voltage across terminals 23 and 26 decreases, causing the relay to be deenergized.

The core means may also be originally constructed having a predetermined air gap in accordance with the desired level of the reference voltage, thereby eliminating the adjusting screw 16. The arrangement shown, however, is considered preferable since it permits fine adjustments to be made and gives the device greater versatility for utilization in many different installations.

It is evident that any desired degree of sensitivity of the device may be obtained by adjusting the initial reference voltage to a desired level above that which causes deenergization of the relay. The sensitivity of the device may also be adjusted by varying the position of the sheets of ferrous material relative to sensing coil 22 and the stray magnetic field surrounding it.

It is apparent from the foregoing that there is provided a new and novel electric sensing device which eliminates the necessity of providing potentiometers or the like in the electrical circuit of the device for adjusting the sensitivity thereof and which is adapted to operate on conventional electric power. All the components of the arrangement shown on the drawing except the relay and electromagnetic counter may also be placed in a sealed container if desired as protection against foreign matter and moisture. The device is simple and inexpensive in construction, yet sturdy and reliable in operation.

While only a preferred embodiment of the invention has been shown and described herein, it will be readily apparent to those skilled in the art that many minor modifications may be made without departing from the spirit of the invention or the scope of the appended claims.

I claim:

1. An electric sensing device which comprises a first elongated ferrous arm, a second ferrous arm connected to said first arm adjacent one end thereof, a third ferrous arm connected to said first arm at an intermediate portion thereof and being disposed substantially parallel to said second arm, a fourth ferrous arm connected to said third arm and being disposed substantially parallel to said first arm, the end of said fourth arm being spaced from said second arm by an air gap, a primary coil disposed around said first arm between said second and third arms, a sensing coil disposed around said first arm between said third arm and the other end of said first arm, a biasing coil disposed around said fourth arm, said biasing coil and said sensing coil each having positive and negative terminals, one terminal of said biasing coil being connected to one terminal of like polarity of said sensing coil, and adjusting means for varying the size of said air gap thereby controlling the voltage induced in the biasing coil, said second arm having a threaded opening formed therethrough adjacent the end thereof, and said adjusting means including a ferrous screw mounted in said opening for movement toward and away from the end of said fourth arm.

2. A sensing device for use in sensing the presence of ferrous members passing along a predetermined path, said sensing device comprising a ferrous core having an elongated first arm disposed generally normal to said path and having one end disposed adjacent to said path, a second arm connected to said first arm remote from said path and extending generally normal to said first arm and generally parallel to said path, a third arm connected to said first arm intermediate the ends thereof, said third arm being parallel to said second arm, a fourth arm connected to said third arm and extending towards said second arm in parallel relation to said first arm, said fourth arm terminating short of said second arm with there being an air gap between opposed portions of said second and fourth arms, all of said arms lying in a common plane and a portion of said first arm and said second, third and fourth arms defining an incomplete loop, a primary coil encircling said first arm intermediate said second and third arms, a biasing coil disposed adjacent to said primary coil and encircling said fourth arm, said primary coil and said biasing coil being on said incomplete core loop and said air gap controlling the reluctance of said core loop and the voltage induced in said biasing coil, a sensing coil encircling said first arm intermediate said third arm and said first arm one end, whereby said primary coil and said sensing coil are in stacked relation, the aforementioned arrangement of said core and said coils placing said sensing coil adjacent said path with said primary and biasing coils being remote from said path and said air gap being further removed from said path, said biasing coil and said sensing coil each having positive and negative terminals, one terminal of said biasing coil being connected to the terminal of like polarity of said sensing coil, a relay coil connected across the other terminals of said biasing coil and said sensing coil, and rectifier means between said relay coil and one of said other terminals.

3. The sensing device of claim 2 wherein said second arm has an adjustable extension aligned with and projecting towards said fourth arm to vary said air gap, thereby varying the reluctance of said core loop and the voltage induced in said biasing coil.

4. The sensing device of claim 3 wherein said adjustable extension is in the form of a ferrous screw extending through said fourth arm and having direct contact with said fourth arm, the projectable length of said screw being greater than the distance between said second arm and said fourth arm, whereby said air gap may be closed.

References Cited in the file of this patent

UNITED STATES PATENTS

| | | |
|---|---|---|
| 2,481,345 | Reynst | Sept. 6, 1949 |
| 2,483,123 | Clapp | Sept. 27, 1949 |
| 2,587,664 | Stout | Mar. 4, 1952 |
| 2,626,297 | Leippe | Jan. 20, 1953 |
| 2,751,150 | Buccicone | June 19, 1956 |
| 2,810,880 | Buccicone | Oct. 22, 1957 |
| 2,827,609 | Smith | Mar. 18, 1958 |

OTHER REFERENCES

Hofberg: Abstract of application Serial No. 570,198, published July 5, 1949.